United States Patent [19]
Hafner et al.

[11] Patent Number: 5,771,343
[45] Date of Patent: Jun. 23, 1998

[54] SYSTEM AND METHOD FOR FAILURE DETECTION AND RECOVERY

[75] Inventors: Edward A. Hafner, Dublin; Charles J. Batka, Hilliard; Elizabeth P. Mellott, Butler, all of Ohio

[73] Assignee: Sterling Commerce, Inc., Dublin, Ohio

[21] Appl. No.: 600,013

[22] Filed: Feb. 14, 1996

[51] Int. Cl.⁶ .................................................. G06F 11/00
[52] U.S. Cl. ................. 395/182.02; 364/265; 364/266.5
[58] Field of Search ....................... 395/182.02, 182.14, 395/182.21; 364/229.4, 230.4, 262.2, 264, 265, 266.5, 281.9, 285

[56] References Cited

U.S. PATENT DOCUMENTS

| | | | |
|---|---|---|---|
| 4,377,000 | 3/1983 | Staab | 371/11 |
| 4,775,976 | 10/1988 | Yokoyama | 371/9 |
| 4,945,474 | 7/1990 | Elliot et al. | 364/200 |
| 5,065,311 | 11/1991 | Masai et al. | 364/200 |
| 5,247,664 | 9/1993 | Thompson et al. | 395/600 |
| 5,278,984 | 1/1994 | Batchelor | 395/650 |
| 5,434,994 | 7/1995 | Shaheen et al. | 395/500 |
| 5,537,642 | 7/1996 | Glowny et al. | 395/800 |

*Primary Examiner*—Robert W. Beausoliel, Jr.
*Assistant Examiner*—Dieu-Minh Le
*Attorney, Agent, or Firm*—Baker & Botts, L.L.P.

[57] ABSTRACT

According to one embodiment of the present invention, a transaction processing system is provided comprising at least one server and a mainframe. Recovery process for restarting a batch is also provided comprising failure detection process for indicating a batch failure, and a startup means responsive to the failure detection process for starting failed batch on the mainframe. In a particular embodiment of the present invention, a batch failure may be indicated by a server's failure to respond to a request or by a step within a batch requiring longer than a predetermined length of time to complete. Further, in alternative embodiments of the present invention, recovery process may run on the mainframe, the server processing the batch, or a secondary server.

23 Claims, 4 Drawing Sheets

SYSTEM AND METHOD FOR FAILURE DETECTION AND RECOVERY

CROSS REFERENCE TO RELATED APPLICATIONS

This application is related to co-pending application entitled CLIENT SERVER DATA TRANSFER SYSTEM AND METHOD Ser. No. 08/600,012, which was filed concurrently herewith and assigned to the Assignee of the present invention.

TECHNICAL FIELD OF THE INVENTION

The present invention relates generally to the field of networked computer systems and more specifically to client server communications applications allowing failure detection and recovery.

BACKGROUND OF THE INVENTION

In an effort to become more efficient, provide quality service and save money, many businesses have decided to migrate their systems to a client server environment or a hybrid environment combining traditional mainframe processing while distributing some processes to remote servers. Client server systems are handling an increasing number of processes distributed over a various machines. For example, Electronic Data Interchange (EDI) allows businesses to exchange many kinds of data with each other electronically. EDI is typically performed through an electronic network. An electronic network is typically owned and operated by a third party service provider which contracts with the businesses subscribing to the electronic network. In a typical arrangement, vendors and purchasers will subscribe to the electronic network. These parties may exchange electronic mail messages (E-mail), purchase orders, approvals and inventories as well as a myriad of other information through the network. Additionally, various levels of processing may occur within the network so as to automate the business transactions occurring between the vendor and the purchaser. Traditionally, this processing typically occurs on a mainframe computer owned by the third party service provider. However, as the number of subscribers increases, the amount of processing load on the mainframe increases. A mainframe system must constantly be upgraded and additional processing power must be added at high cost. One attempted solution is to use client/server or distributed computing components either individually or in combination with a mainframe.

Although existing mainframe systems have robust failure detection and recovery capabilities, client/server environments typically suffer from some important drawbacks with respect to failure detection and recovery procedures. For example, a mainframe may send a transaction to a remote server for processing. In such a case, the transaction may encounter a problem (e.g., a program may terminate abnormally or the entire server may fail). The mainframe will be generally unaware of this problem if it occurs on a remote processor. Although UNIX and other like operating systems for use in a client/server environment have some failure reporting, deficiencies such as a lack of control over or accounting for processes may occur. The likelihood of an undetected failure or a lost process may typically rise to an unacceptable level. In an EDI environment, for example, failed transactions may result in late or unshipped goods between a supplier and retailer resulting in millions of dollars of lost sales. Additionally, even to the extent that client-server based systems do include failure detection and recovery systems, these methods and tools cannot be readily incorporated into and coordinated with an existing mainframe environment.

Accordingly, a need has arisen for a transaction processing system allowing for cost efficient, rapid and reliable data processing in a client/server or in a hybrid mainframe-client/server environment. It is also desirable to provide a system which assures that few, if any, transactions will remain unprocessed and undetected at the close of processing operations without compromising cost or response time with respect to transactions that are processed.

SUMMARY OF THE INVENTION

In accordance with the teachings of the present invention, a transaction processing system which substantially eliminates the problems and disadvantages associated with prior systems and methods is provided.

According to one embodiment of the present invention, a transactions processing system is provided comprising at least one server and a mainframe. Recovery means for restarting a batch is also provided comprising failure detection means for indicating a batch failure, and startup means responsive to the failure detection means for starting a failed batch on the mainframe. In a particular embodiment of the present invention, a batch failure may be indicated by a server's failure to respond to a request or by a batch step or batch completion requiring longer than a predetermined, expected length of time. Further, in alternative embodiments of the present invention, recovery means may run on the mainframe, the server processing the batch, or on a secondary server. Additionally, the startup means may restart the failed batch on a secondary server or on the mainframe.

BRIEF DESCRIPTION OF THE DRAWINGS

A more complete understanding of the present invention may be acquired by referring to the following description taken in conjunction with the accompanying drawings in which like reference numerals indicate like features and wherein.

DETAILED DESCRIPTION OF THE INVENTION

Figure 1:
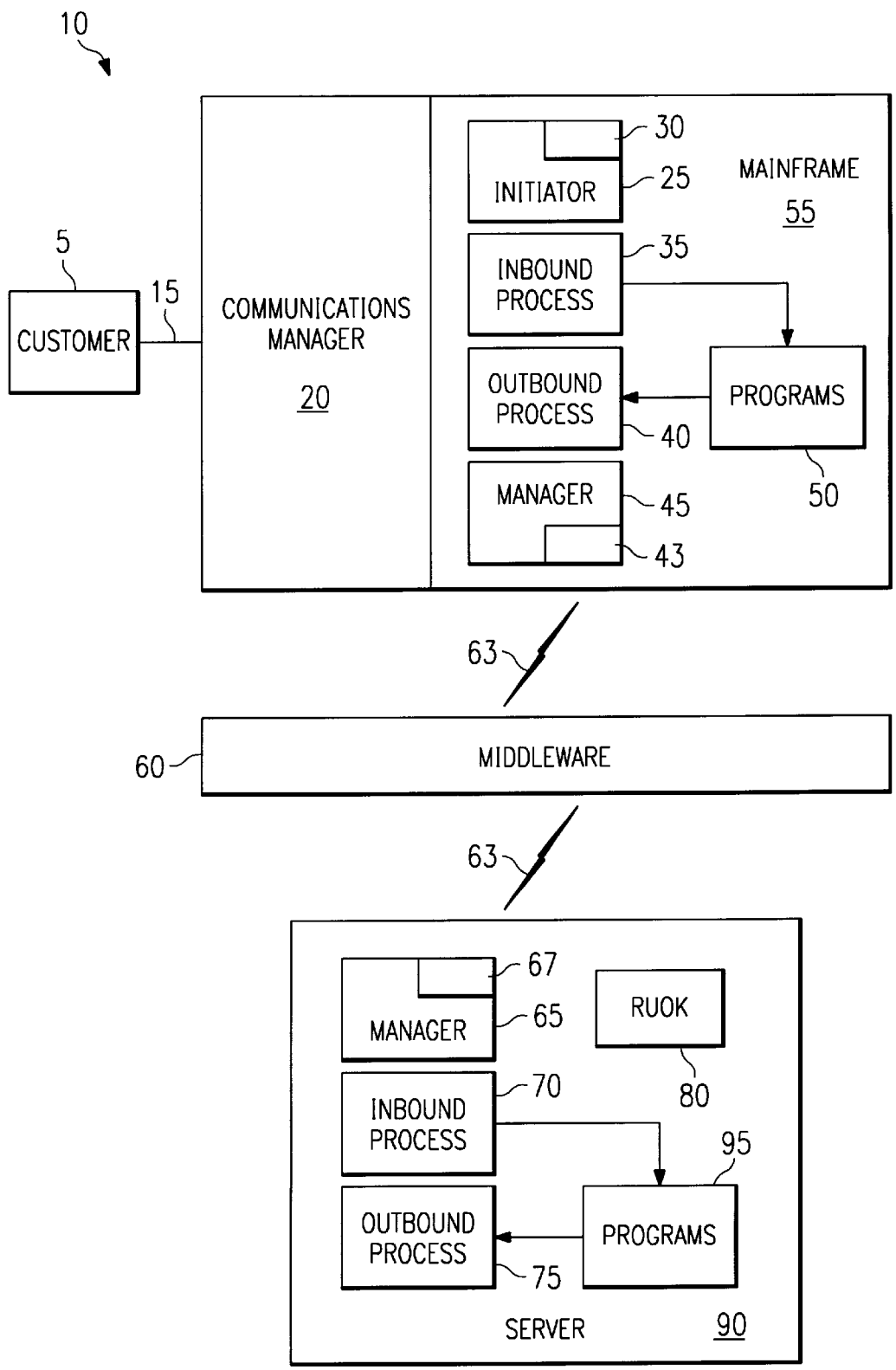
FIG. 1 is a block diagram illustrating a particular embodiment of the transaction processing system of the present invention.
Figure 2:
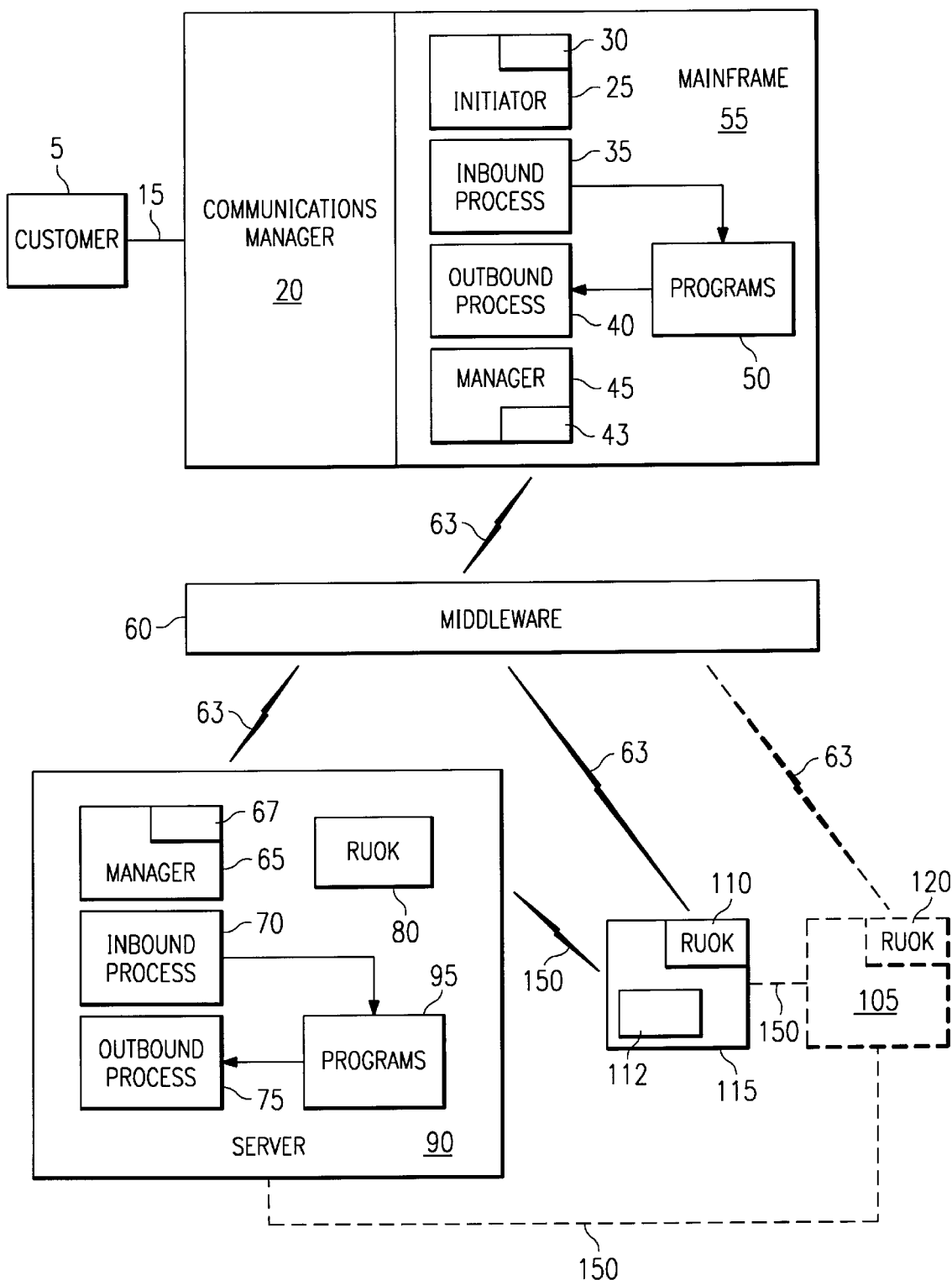
FIG. 2 is a block diagram illustrating another embodiment of the transaction processing system of the present invention.
Figure 3:
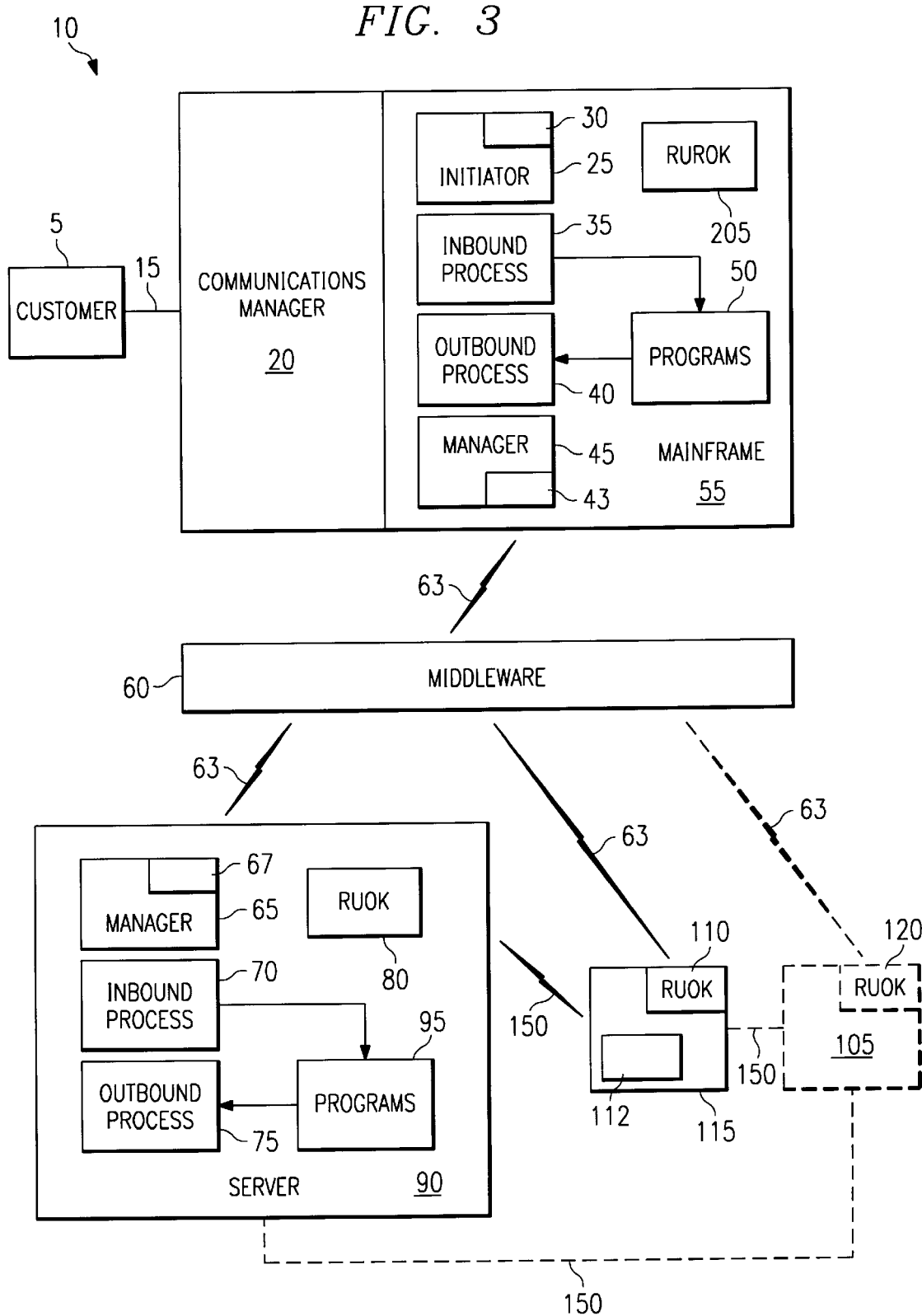
FIG. 3 is a block diagram illustrating yet another embodiment of the transaction processing system of the present invention.

Referring to FIGS. 1, 2 and 3, three particular embodiments of the transaction processing system 10 of the present invention are shown. It should be noted that the teachings of the present invention have broad application in and among a variety of processing systems. Although the following description refers primarily to the processing of "batches", it will be understood by one of ordinary skill in the art that the present invention may similarly be used in an OLTP environment in a manner readily apparent to one of ordinary skill in the art based upon the following description. The benefits of this invention are thus also obtained in a system for processing real time, individual transactions such that robustness and failure detection and recovery are provided.

Mainframe 55 may be an IBM or Amdahl mainframe or any other suitable MVS based system. The teachings of the present invention preferably function in an environment wherein a single mainframe is used. Mainframe 55 comprises a number of processes running either concurrently or in serial fashion. While FIG. 1 illustrates some of the more important processes running on mainframe 55, these processes are by no means exclusive and others may, and typically are, also present and running.

Inbound processes 35, outbound processes 40, value added programs 50, initiator 25, managers 45, and RUROK process 205 may be C or COBOL computer programs, firmware, software or other technology suitable for data manipulation on a mainframe computer. These processes and programs may comprise specifically designed hardware within mainframe 55 or they may operate on a general purpose processor specifically configured through software and/or firmware to accomplish the desired task. As will be apparent to one of skill in the art based upon the description herein, the system of the present invention may include multiple processes or programs for achieving the same function. These programs and processes, in a preferred embodiment of the present invention, operate in parallel. For example, there may be two or more inbound processes 35 running on mainframe 55 concurrently, each processing a portion of the collective data being received.

Remote servers 90, 105 and 115 preferably comprise Sun 1000 processors manufactured by Sun Microsystems. Other remote servers such as International Business Machines' IBM RISC 6000 series, Hewlett-Packard's HP 900 series, or other UNIX based servers may also be used. In a preferred embodiment of the present invention, remote servers 90, 105 and 115 run under a UNIX operating system.

Inbound processes 70, outbound processes 75 value added programs 95, managers 65, and RUOK processes 80, 110 may be C or COBOL computer programs, firmware, software or other technology suitable for data manipulation on a server. These processes and programs may comprise specifically designed hardware within remote servers 90, 105, 115 or they may operate on a general purpose processor specifically configured through software and/or firmware to accomplish the desired task. As will be apparent to one of skill in the art based upon the description herein, the system of the present invention may include multiple processes or programs for achieving the same function. These programs and processes, in a preferred embodiment of the present invention, operate in parallel. For example, there may be two or more inbound processes 70 running on remote server 90 concurrently, each processing a portion of the collective data being received.

In a particular embodiment of the present invention, middleware 60 may comprise an LU6.2 peer to peer programming language and network connection 63, 150 may be a token ring or an Ethernet network. Other suitable communications protocols may be substituted in order to effect communication between mainframe 55 and remote servers 90, 105, and 115.

In a particular embodiment of the present invention, customer system 5 communicates with mainframe 55. Customer system 5 may comprise a personal computer, a mainframe or minicomputer with attached dumb terminal or PC, or any other device providing input and output capabilities as well as communication facilities to enable communication with mainframe 55. Customer system 5 communicates asynchronously though COMMERCE:Network™, or synchronously via open Bisync, SNA 3770, or other suitable means. Mainframe 55 recognizes new processes and may, as a result, initiate an inbound process 35 which sends data to one or more value added programs 50. Value added programs 50 comprise one or more value added programs (e.g., carbon copy, change interchange header type, or extract network commands and perform associated functions). Outbound process 40 formats data generated by or routed through value added programs 50 and prepares the data for delivery to another customer or another system user. Inbound process 35 examines incoming transmissions and determines the type of data received, its target destination and the type of processing which is to be performed upon such data.

For example, inbound process 35 may read customer profile records and determine that the associated data which has been received is an EDI message sent from Company A (purchaser) to Company B (vendor) and requires a carbon copy to be created. Value added programs 50 may generate, for example, a carbon copy of the EDI message and send the updated data either back to inbound process 35, or directly to outbound process 40 or to both inbound process 35 and outbound process 40. Outbound process 40 may determine that the transmission needs to go to a particular mailbox (e.g. SNA or Bisync mailbox), needs to be in records which are a particular block size (e.g., 256, or 400 block records), or requires that records be spanned across blocks. This may be done via a control record within the transmission. In other words, outbound process 40 conditions the data for outbound delivery.

Inbound processes 35 and outbound processes 40 are likely to be among the most CPU intensive processes running on mainframe 55. In the system of the present invention, initiator 25 determines which processes will run on remote server 90 (or 105 or 115). Initiator 25 reads intercept table 30 which describes the type of data and/or transactions which are or are not acceptable for execution on a remote server 90, 105, 115.

TABLE 1

| CUSTOMER | CLIENT SERVER EXCLUDED? |
|---|---|
| CUSTOMER A | YES |
| CUSTOMER B | NO |
| CUSTOMER C | NO |

TABLE 2

| COMMUNICATION PROTOCOL | CLIENT SERVER EXCLUDED? | MAXIMUM NUMBER OF BLOCK TO GO CLIENT SERVER |
|---|---|---|
| SMALL BISYNC | YES | 200 |
| LARGE SNA | NO | 300 |
| ASYNCHRONOUS | NO | 200 |

Tables 1 and 2 illustrate an example of the contents and makeup of intercept table 30. This particular embodiment is by no means exclusive and is merely exemplary. Other fields may be used, added or deleted while remaining within the scope of the present invention. The example in Table 1 illustrates a situation in which Customer A's transactions/batches will never run on a remote server and must always run on mainframe 55. Also, if for example Customer B's transactions/batches are always SNA protocol and 400 or more blocks, they will only run on mainframe 55 since Customer B uses an SNA protocol. However, if Customer C's transactions/batches are asynchronous, then it's transactions which are 200 blocks or less will be selected for execution on a remote server.

In a particular example, remote servers may only process Bisync and asynchronous communication protocols, while mainframe 55 can process all possible modes of communication. Specifically, communication between mainframe 55 and remote server 90 may be impossible since compression algorithms in SNA are incompatible and more complex then those of Bisync. Referring to Table 1, if Customer A sends a 150 block transmission, it will be processed by mainframe 55. If Customer B sends a 150 block transmission, it will be processed by mainframe 55. Finally, if Customer C sends a 150 block transmission, it will be processed by remote server 90. It should be understood that there may be other reasons (i.e., unique data or programs which have not been converted to UNIX) causing particular data sets, batches or transaction sets to be unsuitable for processing on remote server 90. Thus, if it is determined through the use of the intercept table that a remote server cannot process a transaction, that transaction is processed on mainframe 55.

In the particular embodiment illustrated in FIG. 1, manager 45 on mainframe 55 determines whether remote server 90 can accept more work by communicating with manager 65 on remote server 90 over network connection 63 and middleware 60. Manager 65 on remote server 90 is a duplicate process of manager 45 located on mainframe 55. In a particular embodiment of the present invention, inbound process 35, outbound process 40, and manager 45 are matched to analogous remote server programs. For example, manager 45 communicates with related manager 65 on remote server 90. In a preferred embodiment of the present invention, there exists an inbound process 70 located on the remote server 90 for every batch sent to remote server 90. As a result, the same number of inbound processes must be initiated and maintained on mainframe 55.

Typically, several transmissions are processed as described above until several processes based upon value added programs 95 are running on remote server 90. In a particular embodiment of the present invention, each batch sent to remote server 90 may contain a plurality of interchanges (e.g., groups of records in a transmission which a sent by the same sender to the same receiver) which perform a predetermined number of steps. The amount of time these steps should take (or which the whole batch should take) is determined and stored in a table or in a control file. Status table 67, located within the remote server manager 65, stores the steps which have been completed and those which have yet to be completed in byte form. Table 3 illustrates an example of status table 67. This format is merely exemplary and for illustrative purposes only.

TABLE 3

| PROCESS NUMBER | LAST ASSIGNED | LAST REVIEWED | PROGRAM RUNNING | SERVER ACTIVE? | SUBPROCESS NUMBER | SUBPROCESS ACTIVE? |
| --- | --- | --- | --- | --- | --- | --- |
| 1 | 1:00 | 1:15 | CARBON COPY | Y | 1 | N |
| 1 | 1:00 | 1:15 | CARBON COPY | Y | 2 | N |
| 1 | 1:00 | 1:15 | CARBON COPY | Y | 3 | N |
| 2 | 1:00 | 1:15 | CHANGE HEADER TYPE | Y | 1 | N |
| 2 | 1:00 | 1:15 | CHANGE HEADER TYPE | Y | 2 | N |
| 2 | 1:00 | 1:15 | CHANGE HEADER TYPE | Y | 3 | Y |

At suitable intervals, RUOK process 80 is executed so as to copy data from status table 67 to status table 43 (the latter being contained within manager 45 on mainframe 55). RUOK process 80 then checks status table 43 and determines if any step or batch has taken (or is taking) longer than a predetermined amount of time. That predetermined time may be, for example, 45 minutes. If at time 1:30 RUOK process 80 checks the status table, no failure will be indicated because process #2 sub-process #3 has been active for only 30 minutes. See Table 3. However, if at time 2:00 RUOK process 80 checks status table 67, a failure will be indicated because process #2 sub-process #3 has been active for 1 hour. See Table 3. If so, RUOK process 80 orders the shutdown of remote server 90. RUOK process 80 notifies manager 45. Finally, manager 45 then reruns all batches currently running on remote server 90 by checking status table 43 for uncompleted batches. In an alternative embodiment of the present invention, manager 45 may be notified before remote server 90 is shut down.

Referring to FIG. 2, another embodiment of the transaction processing system 10 of the present invention is shown. Specifically, failure is detected on a first remote server by a process running on a second remote server. At least two remote servers 90, 115 may exist, as well as additional remote servers (such as remote server 105). Each remote server may contain a manager 65, inbound processes 70, outbound processes 75, and value added programs 95. A transmission or batch may be selectively allocated to remote servers 90, 105, and 115 by initiator 25 through manager 45. Manager 45 notifies manager 65. Manager 65 determines which server to send batches based on status table 67. For example, manager 65 may use suitable algorithms based upon the individual application to determine how many more tasks each server can process beyond its existing load (load may be determined by checking status table 67). Alternatively, manager 65 may allocate a new batch to the least busy remote server.

In a particular embodiment of the present invention, RUOK process 80 runs periodically. RUOK process 80 may communicate, for example, using RPC calls in TCP/IP protocol over a network connection 150, for example, Ethernet. RUOK process 80 requests status table 112 from RUOK process 110. RUOK process 110 sends its tables to RUOK process 80 over network connection 150. If RUOK process 110 fails to respond in a timely manner, RUOK process 80 orders the shutdown of remote server 115. RUOK process 80 then notifies manager 45. Finally, manager 45 reruns all batches currently running on remote server 90 by checking status table 43 for uncompleted batches. In an alternative embodiment of the present invention, manager 45 may be notified before remote server 115 is shut down. In a particular embodiment of the present invention, a plurality of remote servers 105 each contain one of a plurality of RUOK processes 120 which communicate in the same manner as RUOK process 80 and RUOK process 110. Specifically, each remote server's manager has a copy of each of the other remote servers' status tables. RUOK processes 80, 110, or 120 may perform a recovery process on any other remote server which fails to respond in a timely manner.

Referring to FIG. 3, another embodiment of the transaction processing system 10 of the present invention is shown. Specifically, a failure on a remote server is detected by RUOK process running on mainframe 55. Mainframe 55 periodically runs RUROK process 205. RUROK process 205 may communicate, for example, using C calls in SNA protocol over a network connection 63, for example, token ring network or Ethernet. RUROK process 205 requests status table 67 from RUOK process 80. RUOK process 80 sends its tables to RUROK process 205 over network 63. If RUOK process 80 fails to respond in a timely manner, RUROK process 205 orders the shutdown of remote server 90. RUROK process 205 then notifies manager 45. Manager 45 then reruns all batches currently running on remote server 90 by checking status table 43 for uncompleted batches. In an alternative embodiment of the present invention, manager 45 may be notified before remote server 90 is shut down.

Figure 4:
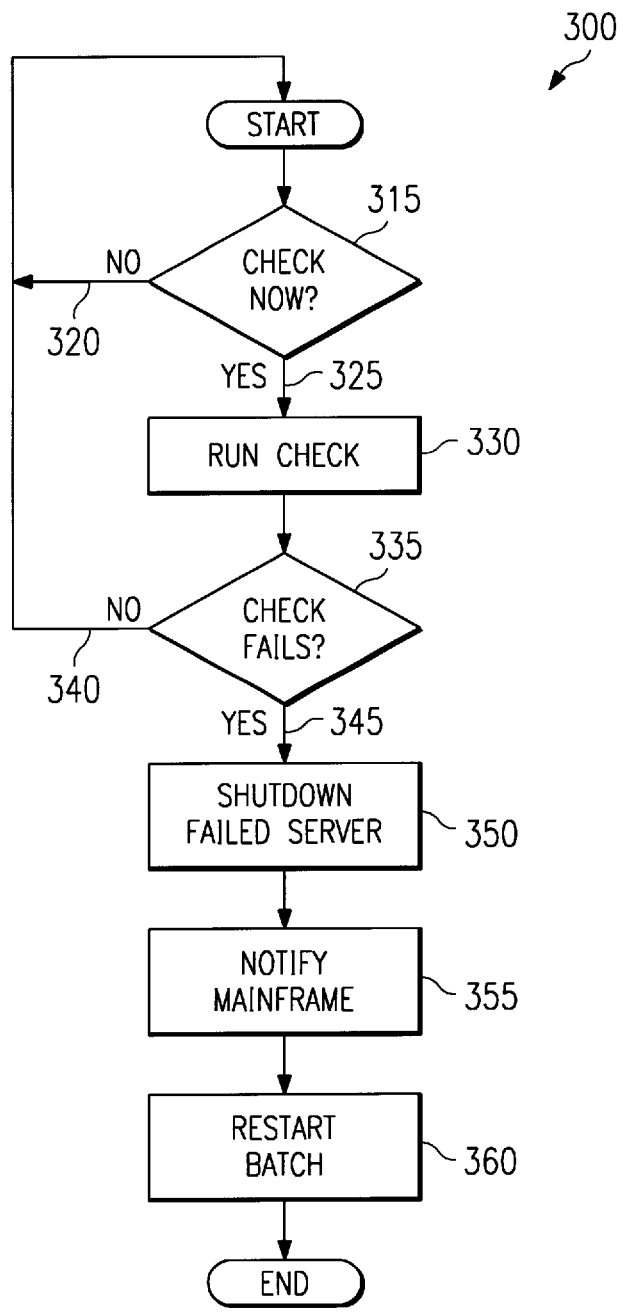
FIG. 4 is a flow diagram illustrating a method of recovery according to a preferred embodiment of the present invention.

Referring now to FIG. 4, a particular embodiment of the method 300 of the present invention is shown. A recovery process may run on demand or on a schedule. Step 315. If requested, the recovery process checks to determine if there is a problem with a server. Step 330. In a particular embodiment of the present invention, the recovery process runs on the same server it is checking and checks by determining the progress of a batch or transaction in a status table. In another embodiment of the present invention, the recovery process runs on a first server and checks a second server by requesting a response. A failure may be indicated by the lack of a response in a predetermined amount of time. In yet another embodiment of the present invention, the recovery process runs on a mainframe and checks a server by requesting a response. A failure may be indicated by the lack of a response in a predetermined amount of time. Step 330. If the check does not report a failure, normal processing continues. Step 340. If, however, a failure is indicated, the recovery process will request the shutdown of the failed server. Step 345, 350. This notification may be from a recovery process to a manager process on the mainframe. Next, the mainframe is notified. Step 355. Finally, the mainframe will restart the uncompleted tasks from the failed server based on the status table. Step 360.

The above description is merely illustrative of the present invention and should not be considered to limit the scope thereof Additional modifications, substitutions, alterations and other changes may be made to the invention without departing from the spirit and scope thereof as defined by the appended claims.

What is claimed is:

1. A transaction processing system for processing transactions and providing failure detection and recovery comprising:

a mainframe computer;

at least one remote server, said at least one remote server in communication with said mainframe computer;

said at least one remote server processing transactions sent by the mainframe computer;

recovery means for detecting a failure occurring on said at least one remote server and for restarting said transactions affected by said failure;

wherein said recovery means comprises a failure detection means for detecting failures occurring upon said at least one server and a startup means for restarting said transactions affected by said failure;

wherein said failures comprise batch failures and remote server failures; and wherein said failure detection means indicates a failure when the processing of said batch requires longer than a predetermined amount of time.

2. The transaction processing system of claim 1 wherein said transactions affected by said failure are restarted on said mainframe computer.

3. The transaction processing system of claim 1 wherein said transactions affected by said failure occurring on a first remote server are restarted on a second remote server.

4. The transaction processing system of claim 1 wherein said failure detection means indicates a failure when a batch processing process fails to respond.

5. The system of claim 1 wherein said failure detection means detects failures using a status table.

6. The system of claim 5 wherein said status table indicates the completion of batch segments within interchanges.

7. The system of claim 1 further comprising:

a communications manager;

an initiator;

at least one inbound process; and at least one outbound process.

8. The system of claim 1 further comprising middleware allowing communication between said mainframe computer and one or more of said remote servers.

9. The system of claim 8 further comprising a network for communication between said mainframe and said at least one remote server.

10. The system of claim 9 wherein said network comprises an Ethernet network.

11. The system of claim 1 comprising a single remote server.

12. The system of claim 1 further comprising a customer system in communication with said mainframe computer.

13. A transaction processing system for processing individual transactions and batches of transactions and providing failure detection and recovery comprising:

a main frame computer;

at least one remote server, said at least one server in communication with said mainframe computer;

said at least one remote server processing transaction batches sent by the mainframe computer;

manager means running said at least one remote server for managing processing of said transaction batches;

failure detection means for detecting a failure of batch processing when the processing of said batch requires longer than predetermined amount of time on said at least one remote server, said failure detection means notifying said manager means in the event of a failure; and said manager means further comprising startup means responsive to said failure detection means for starting sad failed batch on said mainframe computer.

14. The system of claim 13 wherein said manager means is further operable to shut down a remote server in the event that a failure occurs on said remote server.

15. The system of claim 13 wherein said failure detection means comprises a process running on said remote at least one server.

16. The system of claim 13 further comprising a duplicate manager means running on said mainframe computer.

17. The system of claim 13 further comprising at least one inbound process running on each of said remote servers.

18. The system of claim 17 further comprising a duplicate inbound process running on said mainframe computer for each inbound process running on said remote servers.

19. The system of claim 13 further comprising at least one outbound process running on each of said remote servers.

20. The system of claim 19 further comprising a duplicate outbound process running on said mainframe computer for each outbound process running on said remote servers.

21. The system of claim 13 further comprising means for detecting failures within said failure detection means.

22. The system of claim 21 wherein said means for detecting failures within said failure detection means queries a status table indicative of the status of each remote server in order to detect failures within said failure detection means.

23. A method for detecting and restarting a failed batch in a transaction processing system, said transaction processing system comprising a mainframe computer and at least one remote server in communication with said mainframe computer, said method comprising the steps of:

initiating a recovery process on said at least one remote server;

sending a batch process from the mainframe computer to the remote server;

starting the batch process on said at least one remote server;

determining a failure of said batch process the processing of said batch require longer than a predetermined amount of time; and in the event said batch process has failed, restarting said batch process on said mainframe computer.

* * * * *